(12) United States Patent
Staadecker et al.

(10) Patent No.: US 7,119,048 B2
(45) Date of Patent: Oct. 10, 2006

(54) DRY ERASE BOARD FOR MAGNETS

(75) Inventors: Bert Staadecker, Hudson, OH (US); Daniel P. Ross, Westlake, OH (US); Donald L. Ross, Cleveland, OH (US)

(73) Assignee: Off the Wall Creations, LLC, Cleveland, OH (US)

( * ) Notice: Subject to any disclaimer, the term of this patent is extended or adjusted under 35 U.S.C. 154(b) by 175 days.

(21) Appl. No.: 10/469,265

(22) PCT Filed: Feb. 28, 2002

(86) PCT No.: PCT/US02/06346

§ 371 (c)(1),
(2), (4) Date: Feb. 5, 2004

(87) PCT Pub. No.: WO02/068213

PCT Pub. Date: Sep. 6, 2002

(65) Prior Publication Data

US 2004/0110032 A1    Jun. 10, 2004

Related U.S. Application Data

(60) Provisional application No. 60/272,084, filed on Feb. 28, 2001.

(51) Int. Cl.
*B41M 5/035* (2006.01)
*B41M 5/38* (2006.01)

(52) U.S. Cl. ...................... 503/227; 427/146
(58) Field of Classification Search ............... 503/227; 427/146; 428/195.1, 209, 692.1
See application file for complete search history.

(56) References Cited

U.S. PATENT DOCUMENTS

| | | | |
|---|---|---|---|
| 4,354,851 A | 10/1982 | Hix et al. | |
| 4,395,263 A | 7/1983 | Davis | |
| 4,584,223 A | 4/1986 | Krapf | |
| 5,108,818 A | 4/1992 | Ebina et al. | |
| 5,142,722 A | 9/1992 | Kolb | |
| 5,295,342 A | 3/1994 | Roche et al. | |
| 5,527,568 A | 6/1996 | Boone et al. | |
| D377,948 S | 2/1997 | Pruhs | |
| 5,599,866 A | 2/1997 | Staadecker | |
| 5,609,788 A | 3/1997 | Deetz | |
| 5,836,038 A | 11/1998 | Thorp | |
| 5,843,329 A | 12/1998 | Deetz | |
| 6,067,266 A | 5/2000 | Donelan | |
| 6,126,699 A | 10/2000 | McCurley | |
| 6,242,055 B1 | 6/2001 | Neumann et al. | |
| 6,284,327 B1 | 9/2001 | Neumann et al. | |
| 6,340,504 B1 | 1/2002 | Neumann et al. | |

FOREIGN PATENT DOCUMENTS

| | | | |
|---|---|---|---|
| GB | 1390545 | * | 4/1975 |
| WO | 01/12743 | * | 2/2001 |

* cited by examiner

*Primary Examiner*—Bruce H. Hess
(74) *Attorney, Agent, or Firm*—Roetzel & Andress; George W. Moxon, II

(57) ABSTRACT

A dry erase board that will accept writing, figures, and designs, while being erasable, and to which magnets will adhere. The board exhibits properties of a metallic board so that the surface of the board can receive magnets. The board can also be printed by silk-screening or sublimation printed with inks to produce graphics which are permanently on the surface of the board and are not erased.

14 Claims, No Drawings

DRY ERASE BOARD FOR MAGNETS

CROSS REFERENCE TO RELATED APPLICATION

This is a non-provisional of provisional patent application Serial No. 60/272,084, filed Feb. 28, 2001 now abandoned, entitled "Magnetic Coating Or Paint For A Dry Erase Board."

BACKGROUND OF THE INVENTION

The present invention relates to a dry erase board that exhibits properties of a metallic board, in that the surface receiving the coating or paint is able to receive magnets. Dry erase boards are also known as whiteboards because of their typical light or white surface which contrasts with the colored pens uses to write or draw on them or marker boards because they can be marked on and subsequently erased. For the purposes of this application, the term "dry erase board(s)" is intended to include whiteboards, marker boards, and similar type boards and surfaces.

A further feature of such a dry erase board is that this coating creates a surface that accepts permanent printing that can be erased. The board can be made by coating or paint a substrate or by molding a bulk material. Thus, the dry ease board has the following characteristics: writable, erasable, printable, sublimatable, and the ability to receive and hold magnets.

Dry erase boards are a well-known method for writing information temporarily. Dry erase boards are commonly used in offices, schools, and other locations where a chalkboard might otherwise be found. Writings on a dry erase board are erasable by wiping lightly with felt, dry cloth or paper. Suitable dry erase surfaces generally include a melamine, acrylic, vinyl chloride, polypropylene, polyethylene, polyethylene terephthelate, polystyrene, cellulose acetate, polyurethane, porcelain, high pressure laminate or enamel resin layer affixed to a backing. Such dry erase boards are characterized in that they have hard, white surfaces that are very smooth in appearance, and are essentially nonporous. Alternatively, a dry erase board may comprise a sheet of polymeric film or UV curable resin.

As noted, a variety of compositions are known for use in writing on impervious writing surfaces such as dry erase boards. These coloring compositions suitable for use on dry erase boards must erase easily without requiring a comprehensive cleaning. Additionally, the dry erase board compositions must be erasable without leaving visible remains commonly termed "ghosting." Special pens that contain non-permanent ink that can be easily erased are used to write on a dry erase board. This ink dries on the substrate but does not bond to the surface of the substrate so it can be easily removed.

U.S. Pat. No. D377,948 to Pruhs, discloses a simple dry erase board. Typically, dry erase boards have not been able to display graphics. However, U.S. Pat. No. 6,067,266 to Donelan discloses an erase board comprised of a substrate layer disposed underneath a clear film layer. Dry erase markers can be used to write on the clear film layer, while graphics or designs are displayed through the clear film by placing them directly on the substrate or on a middle sheet between the clear layer and substrate. Graphics and other designs may be printed either by hand or by computer on the substrate or a middle sheet between the clear layer and the substrate. The middle sheet can be replaced on substituted with another middle sheet having an alternative design printed on it. Further, Starline Pacific, Inc., Phoenix, Ariz., sells a line of Unisub Imprintables, including dry erase boards, which can have graphics applied by sublimation printing.

Another dry erase board comprised of a laminate core is disclosed in U.S. Pat. No. 5,527,568 to Boone, et al. Boone's invention is comprised of a corkboard or other tack penetrable material mounted to the backing of a substrate with a dry-erase laminate mounted to the corkboard. The laminate is in the center of the board and dry erase markers can be used to write on the board. The surrounding corkboard can be used to tack on notes, pictures, etc.

Dry erase boards have been made which will attract and hold magnets, but these have been made of porcelain coated over steel. While it produces a surface which can be marked on and erased, and which will accept magnets, it cannot be cut with out chipping the enamel coating and they tend to be relatively heavy. Further, additional coatings cannot be added because of the porcelain finish.

Magnetic materials have been previously used in connection with erasers for dry erase boards, but only as U.S. Pat. No. 5,836,038 to Thorp discloses, as a magnetic mount dry eraser. The eraser contains magnetic material that secures the eraser to a metallic surface that is mounted on a surface of the dry erase board. However, the eraser is not magnetically attracted to the dry erase board.

U.S. Pat. No. 5,295,342, to Roche, et al., discloses a composite board material that will accept both tack mounted notes and magnet mounted notes. Roche, et al. teach a display board comprised of a permeable panel and a ferromagnetic apertured material on the surface of the panel, which can receive magnetic means for securing items displayed on the panel. U.S. Pat. No. 4,584,223, to Krapf, also teaches a magnetic display panel, which consists of a magnetic display panel made of a light, rigid cardboard or foamed cork core with laminations of non-perforated steel foil arranged thereon.

Magnetic paint is disclosed in U.S. Pat. No. 5,609,788 and U.S. Pat. No. 5,843,329 to Deetz. The Deetz patents teach a magnetic paint formulated from a premix of ferromagnetic particles blended with a surfactant. The premix is then blended with a paint and can be applied to surfaces such as wood, wall board, sheet rock, foam, plywood, plastic, fiberboard, and the like. Further, U.S. Pat. No. 5,599,866 to Staadecker relates to a surface coating composition comprised of a latex-base paint with particles of a Group VIII metal. When applied to a surface, the composition allowed it to retain a magnetized object.

Substrates having surfaces that will accept sublimatable inks, usually in the form of a decoration or design, and that are used in conjunction with radiation curable top coats are known, such as, U.S. Pat. Nos. 6,242,055; 6,284,327; and 6,340,504 to P. Neumann et al. These coatings can be applied to substrates such as cement board, wood, plastic, high pressure laminates, ceramic or metal. Laminates with sublimated designs or graphics can be used like tiles on walls or for labels, identification badges, displays, table tops, cabinet doors, and the like.

SUMMARY OF THE INVENTION

The present invention is to a board that accepts writing, drawing or other markings, while those markings are erasable, and to which magnets will adhere. The board exhibits properties of a metallic board in that the surface of the board can receive magnets. The surface of the board can also be decorated with printing or other graphics by silk-screening or sublimation with inks to produce graphics that are permanently on the surface of the board and are not erased. As noted earlier, the term "dry erase board(s)" is intended to include whiteboards, marker boards, and similar type boards and surfaces which can accept writing, drawing and other markings, while allowing for those markings to be easily erased.

Thus, the present invention provides a dry erase board that will allow magnets to adhere. A primary advantage of the present invention is that it will provide greater versatility as a dry erase board in that it also can be imprinted with graphics while still being for use with dry erase inks or magnetic objects. Further, the dry erase boards need not be made with rigid substrates, can could be made from semi-rigid substrates.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

DETAILED DESCRIPTION OF THE INVENTION

As noted, the present invention is to a board that accepts writing, drawing, and other graphics, while being erasable to remove those graphics, and to which magnets will adhere. The boards can also be printed by silk-screening or sublimation with inks to produce graphics which are permanently on the surface of the board and are not erased by the use of the board. The board exhibits properties of a metallic board in that the surface of the board can receive magnets, but is lighter in weight, and can be easily sized and machine cut, especially compared to the metallic or ceramic boards. So, the boards can be easily shaped after they are made and are not limited to square or rectangular shapes. Thus, any geometry is possible. The printable characteristic allows for a variety of graphics to be put on the surface of the board, with out the need for protective laminates or other coatings.

The boards can be made by coating or painting on a variety of substrates or may be made by molding a bulk composition. The boards are preferably made with rigid or semi-rigid substrates. The boards them selves are not magnetic but exhibit an ability to hold magnets.

The substrate can be any appropriate panel materials, such as wood, cardboard, polymeric compositions, foam compositions, fiberglass, fiberglass reinforced polyester, dry wall board, cement board, gypsum board, hardboard, or fluted polyethylene, where the substrate can be made into a product that contains the characteristics of the present invention. As can be appreciated, some surfaces will be more compatible to the coating compositions in accordance with the present invention, while others may need additional preparation steps or coatings. For example, when the substrate is wood, it may be desirable to sand the wood surface that is to be coated to provide an appropriate level of smoothness and/or to prepare the surface to accept the coating layers that create a marking surface that accepts magnets.

The coating can be applied in a two step process or a one step process. That is to say that the coating can be applied in what is, basically, a two-step process. The first step would be to apply a paint or coating that contains metallic particulate. The next step would be to apply a coating that gives the board characteristics of a dry erase or dry marker board. In fact, as is common in the coating industry, the actually coating may involve many sub-steps. That is, the nature of the coating composition or the limitations of the coating and drying equipment may necessitate each step be done by building up several layers until the coating is the appropriate thickness. While it is desirable to do the coating in one pass, and there may be materials that lend themselves to such a process, the reality is that each step will probably involve at least two and perhaps more layers. For example, where the appropriate thickness of the coating is 2 to 5 mils, the coating could be applied in three layers of about 0.5 to 3.0 mils per layer, preferably 1.5 to 2.5 mils per layer, to produce a coating having the appropriate thickness.

In the first step, a board, e.g., a wood substrate, which can be solid wood, a laminated wood product, or a wood composite, is coated with a paint or coating to provide the magnetic characteristic, i.e., a coating that will attract and hold, or is attractive to, magnets. As noted, this could be done by building up several layers. The magnetic paint could be that disclosed in U.S. Pat. No. 5,609,788 and U.S. Pat. No. 5,843,329 to Deetz, which patents are incorporated herein by reference, and which teach a magnetic paint formulated from a premix of ferromagnetic particles blended with a surfactant, and then blended with a paint and can be applied to surfaces such as wood, wall board, sheet rock, foam, plywood, plastic, fiberboard, and the like. Another magnetic paint is U.S. Pat. No. 5,599,866 to Staadecker, which is incorporated herein by reference, and which discloses a surface coating composition comprised of a latex-base paint with particles of a Group VIII metal. Other coating materials to make the coating that will ultimately attract and hold magnets, include a number of polymeric compositions, such as polyester/acrylic polymeric compositions or epoxy/acrylate polymer compositions into which the ferromagnetic particles are incorporated. Such compositions are available from PPG, Van Technologies, Epoxies, Etc., Teijin Seiki Company, Ltd., Bayer, Sartomer Company, and others. Ferromagnetic particles that can be employed will be able to attract and hold magnets and include powdered iron and steel, iron alloys with nickel, zinc, copper, and the like, ferrosillicone powder, carbonized iron, ferric oxides, and natural and artificial magnatites, hermatites and ferrites. The size is not critical, but finely divided power in the range of 1.0 to 250.0 microns will be used, with 1.0 to 45.0 microns being preferred, and less than 10 microns being further preserved. The amount of ferromagnetic particles will provide a density of 0.01 to 3.0 grams per square inch, preferably 0.2 to 0.5 grams per square inch.

As the next step, in a two-step process, a coating is applied over the magnetic paint, and cured to create a dry erase surface. Again, this step could involve the build up of several layers to achieve the appropriate amount of coating or it could be achieved in one step, depending upon the materials involved. The layering is not critical and is such as is practiced in the art. For example, if the first step produced a coating of about 2 to 5 mils, and the second step or coating produced a coating of 2 to 5 mils, the total coating would be 4 to 10 mils thick. The amount of each coating is not critical, but is enough to be adequate. Each coating is in an amount of about 1.0 up to 12.0 mils thick. The total of all the coatings will be in the range of 4.0 to about 20.0 mils thick, with 4.0 to 12.0mils thick being preferred. The precise thickness will depend upon, for example, the coating materials employed, the hiding power, the amount of magnetic characteristic desired, the costs involved, and the finish. The dry erase coating can be any composition which would provide a typical whiteboard surface, including melamine, acrylic, vinyl chloride, polyester, polypropylene, polyethylene, polyethylene terephthalate, polystyrene, cellulose acetate, polyurethane, or enamel resin. The surface of the board that is desired may be influenced by the polymeric composition that is chosen, but that surface appearance is not critical, but a matter of choice. Further techniques, for affecting the surface of the board are known in the art, including the use of nitrogen blankets to produce high gloss finishes.

In the two-step process, each layer, in the sense of the magnetic layer and the dry erase layer, is selected for its compatibility with the substrate as well as with the composition of each layer. But, other factors could include the desired cost and surface characteristics since the various coating compositions will produce different surface and wear characteristics. Preferably, each layer or sub-layer is applied by roll coat, toll coat, curtain coat, or spray coat technique. Alternatively, each layer could be applied by a laminating technique, where each layer is made independently and subsequently brought together on the surface of the substrate and bonded to it.

A preferred composition for the dry erase surface, is a polyester composition. If graphics were desired for the dry erase surface, they could be applied via a variety of printing techniques, such as silk screen or sublimation printing. There a variety of techniques for sublimation printing of polymeric surfaces, including polyesters. For example, U.S. Pat. No. 4,395,263 to Elbert; U.S. Pat. No. 5,108,818 to Ebina et al; U.S. Pat. No. 5,142,722 to Kolb; U.S. Pat. No. 6,126,699 to McCurley; and U.S. Pat. No. 4,354,851 to Hix et al, all of which are incorporated herein by reference, all teach applying polymeric coatings to substrates and decorating them by sublimation transfer printing. Alternatively, if it is desirable to apply decorative graphics via a sublimation technique, and the dry erase surface is not appropriate, a third or additional coating could be applied to produce a surface that will accept sublimatable ink. Examples of such coatings are polyesters and urethane acylates that curable via UV radiation or via electron beam curing. Example of such coatings can be found in Neumann et al U.S. Pat. Nos. 6,242,055; 6,284,327; and 6,340,504, the teaching of which are incorporated herein by reference. Although the invention is not limited to sublimation printing and the panel could be decorated by a silk screen printing technique or by any other appropriate printing technique. Further, the board could be used unprinted since it would still be a surface on which writing or figures can be placed and erased, and to which magnets will adhere.

Another way to make the board is by applying the coating is a single-step system. This process utilizes a composition which contains the metallic particles which will allow the surface to receive magnets while it is also useful as a dry erase surface. Once such composition would be a polyester composition. Further, the composition would be preferably cured without having to subject the board to extreme heat. One process would be to cure the coating on the board using ultraviolet light (UV cured) or electron beam curing (EB). Thus, the coating or paint, containing metallic particulate can be applied in a one-stage or step process so that the composition would provide the magnetic and dry erase characteristics with the same composition. Again, the one-step process could involve the use of the layering technique discussed earlier. But, since they are all the same compositionally, there is no issue with the layers being incompatible. The preferred approach is to apply the composition by a roll coat, a toll coat, or a spray coat technique. Alternatively, the polymeric surface could be manufactured separately from the substrate and subsequently laminated to the substrate.

Finally, the board could be made by molding a composition containing the magnetic particles to produce a panel having a dry erase surface and an ability to hold magnets. For example, a polymeric composition made up of a moldable polymer containing a filler material and magnetic particles, can be shaped and cured to make a panel or board having a dry erase surface and an ability to hold magnets. In this way it can be made in a variety of shapes as long as it provided a continuous flat surface for writing and placing magnets.

Although the invention has been described in terms of a panel or dry erase board, it is not limited to that structure and could be made as a wall unit or as a form of wall display, wall paper, and the like, where an entire wall would be useable to write ideas or cartoons or graffiti, while still being erasable and allowing magnets to be adhered. Where the wall paper needs to be several layers, it can be applied as an upper dry erase layer having the dry-erase surface and a sub-layer presenting the magnetic characteristics.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claim is:

1. A dry erase board comprising a rigid or semi-rigid structure having as its surface a composition that provides a smooth, virtually non-porous polymeric surface to which can be applied legible markings and writing which can be easily erased, and to which magnets can be adhered, wherein the board has a first composition comprising a cured mixture of a polymer and ferromagnetic particles and the surface is a second composition which is adhered to the first composition and will accept the writing and graphics, which areerasable, on its surface.

2. The dry erase board of claim 1 where the marker board has a laminated core.

3. The dry erase board of claim 1 where the marker board is a coated core.

4. The dry erase board of claim 1 where the marker board is printed by silk-screening or sublimation to produce permanent graphics or pictures on the surface of the board.

5. The dry erase board of claim 1 where the marker board exhibits the following characteristics: writable, erasable, magnetic, and sublimatable.

6. The dry erase board of claim 1 wherein the first composition is a cured mixture of a polymer selected from the group consisting of polyesters, epoxies, urethanes, acrylates, and mixtures thereof.

7. The dry erase board of claim 1 wherein the second composition is a cured polymer selected from the group consisting of polyesters, epoxies, urethanes, acrylates, and mixtures thereof.

8. The dry erase board of claim 1 having a surface which has been printed by sublimation printing.

9. The dry erase board of claim 8 wherein the surface has an additional coating thereon which will accept printing by sublimation.

10. A method of making a dry erase board that provides a smooth, virtually non-porous polymeric surface to which can be applied legible markings and writing which can be easily erased, and to which magnets can be adhered, wherein the board has a first composition comprising a cured mixture of a polymer and ferromagnetic particles and the surface is a second composition which is adhered to the first composition and will accept the writing and graphics, which areerasable, on its surface, by a two step system which comprises applying a coating containing metallic or ferrometallic particulate as a first coating to a rigid or semi-rigid substrate, and subsequently applying a second coating which provides the dry erase board characteristics to the board.

11. The method of claim 10 wherein each coating is made by the build-up of layers of the coating composition.

12. The method of claim 10 wherein the method additionally includes a step of printing graphics on the surface of said board.

13. The method of claim 10 wherein the surface of the board is coated with a composition which is radiation curable and which will accept printing via a sublimatable ink, said radiation curable coating is cured, and graphics are printed, using a sublimatable ink, on said cured coating.

14. The method of making a dry erase board that provides a smooth, virtually non-porous polymeric surface to which can be applied legible markings and writing which can be easily erased, and to which magnets can be adhered, wherein the board has a first composition comprising a cured mixture of a polymer and ferromagnetic particles and the surface is a second composition which is adhered to the first composition and will accept the writing and graphics, which are erasable, on its surface as a single step system comprising applying a UV or EB curable coating that contains metallic particulate to a rigid or semi-rigid board to provide a surface that has dry erase board characteristics and that will hold magnets, and curin said coating.

* * * * *